(12) United States Patent
Yamasaki et al.

(10) Patent No.: US 12,354,161 B2
(45) Date of Patent: Jul. 8, 2025

(54) POWER GENERATION PLANT OPERATION ASSISTANCE SYSTEM AND POWER GENERATION PLANT CONTROL SYSTEM

(71) Applicant: Hitachi, Ltd., Tokyo (JP)

(72) Inventors: Shuhei Yamasaki, Tokyo (JP); Hiroto Takeuchi, Tokyo (JP); Keisuke Noda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 124 days.

(21) Appl. No.: 17/913,452

(22) PCT Filed: Feb. 18, 2021

(86) PCT No.: PCT/JP2021/006191
§ 371 (c)(1),
(2) Date: Sep. 22, 2022

(87) PCT Pub. No.: WO2022/044373
PCT Pub. Date: Mar. 3, 2022

(65) Prior Publication Data
US 2023/0129742 A1     Apr. 27, 2023

(30) Foreign Application Priority Data

Aug. 25, 2020  (JP) ................. 2020-141780

(51) Int. Cl.
*G06Q 40/04*  (2012.01)
*G06Q 10/063*  (2023.01)
(Continued)

(52) U.S. Cl.
CPC ............ *G06Q 40/04* (2013.01); *G06Q 30/08* (2013.01); *G06Q 50/06* (2013.01); *G06Q 10/063* (2013.01)

(58) Field of Classification Search
None
See application file for complete search history.

(56) References Cited

U.S. PATENT DOCUMENTS

| | | | |
|---|---|---|---|
| 2005/0015283 A1* | 1/2005 | Iino | H02J 3/008 700/286 |
| 2017/0310115 A1* | 10/2017 | Miyake | H02J 3/466 |
| 2019/0252880 A1* | 8/2019 | Watanabe | G06Q 50/06 |

FOREIGN PATENT DOCUMENTS

| | | |
|---|---|---|
| JP | 09-121457 A | 5/1997 |
| JP | 2006-235888 A | 9/2006 |

(Continued)

OTHER PUBLICATIONS

Su, Chua-Liang, and Daniel Kirschen. "Quantifying the effect of demand response on electricity markets." IEEE Transactions on Power Systems 24.3 (2009): 1199-1207. (Year: 2009).*

(Continued)

*Primary Examiner* — Edward J Baird
*Assistant Examiner* — Brock E Turk
(74) *Attorney, Agent, or Firm* — MATTINGLY & MALUR, PC

(57) ABSTRACT

Bids on a power trading market can be performed to improve an economic balance of power generation plants and power companies. In order to solve the above problems, in the present invention, a plant operation assistance system 10 that assists the operation of a thermal power plant 1101 and a pumped storage power plant 1102, which supply power to a power transmission network A, specifies a power amount that can be bid on a power trading market based on net reserve power of the power plants including another company's power generation plant 3001 when power sales on the power transmission network A drop, transmits bid data including the power amount to a power exchange system 20, and can transmit power from the power generation plant to a power transmission network B if contracted by the power exchange system 20.

6 Claims, 11 Drawing Sheets

(51) Int. Cl.
*G06Q 30/08* (2012.01)
*G06Q 50/06* (2024.01)

(56) References Cited

FOREIGN PATENT DOCUMENTS

| | | |
|---|---|---|
| JP | 2009-303411 A | 12/2009 |
| JP | 2016-136313 A | 7/2016 |
| JP | 2018-163516 A | 10/2018 |
| WO | 2016/059668 A1 | 4/2016 |
| WO | 2018/037477 A1 | 3/2018 |

OTHER PUBLICATIONS

Gonzalez-Garrido, Amaia, et al. "Annual optimized bidding and operation strategy in energy and secondary reserve markets for solar plants with storage systems." IEEE Transactions on Power Systems 34.6 (2018): 5115-5124. (Year: 2018).*
International Search Report of PCT/JP2021/006191 dated Apr. 20, 2021.

* cited by examiner

POWER GENERATION PLANT OPERATION ASSISTANCE SYSTEM AND POWER GENERATION PLANT CONTROL SYSTEM

TECHNICAL FIELD

The present invention relates to a technique for performing operation management of a power generation facility and a power plant (hereinafter, referred to as a power generation plant). Among them, particularly, the present invention relates to a technique for creating an operation plan for a power generation plant and controlling the power generation plant.

BACKGROUND ART

With the progress of power liberalization since 2015, the number of new entrants to a power business (hereinafter referred to as new power companies) has been increasing. In addition, in 2020, the former general power companies (so-called power companies in each region) will carry out the separation of power generation and power transmission. Prior to the separation of power generation and power transmission, equipment operation has been carried out across the fields of power generation/power transmission/power distribution under the organizational structure of the former vertically integrated general power companies. The operating cost has also been integrated by a total cost method.

Each company after the separation of power generation and power transmission has been spun off, and especially at power generation establishments, business activities to maximize profits are acquired more than now because of the fixed cost of operating the power generation plant in addition to a balance between a fuel cost to purchase and the amount of power sold. Moreover, higher efficiency of power generation plants is inevitably required.

In view of such a premise, a technique for operating a power generation plant, adjusting the amount of power generation, and planning power generation has been proposed. For example, PTL 1 discloses a power adjustment system, "which applies to a power supply system that supplies power from multiple power generation facilities each having a power generation unit that generates power by use of renewable energy to a common power system. The power adjustment system is provided corresponding to each of the multiple power generation facilities, and includes multiple energy management units that control each of the multiple power generation facilities so that a deviation of a power generation value from a power target value of each power generation facility is eliminated, and an integrated energy management unit that changes any power generation value of the multiple power generation facilities under control so that a deviation of a total value of the power generation values of the multiple power generation facilities from a total value of the power target values of the multiple power generation facilities is eliminated".

Further, PTL 2 discloses a configuration, in which for the purpose of "improving the accuracy of demand forecast and create an appropriate power generation plan", "a demand forecast unit obtains rough demand forecast data D1 based on weather forecast information WD from a meteorological company and demand record data stored in a demand record data storage unit, and a correction unit corrects the demand forecast data D1 based on power outage information of consumers by regular inspection etc., department store inventory information, building tenant closure information, factory load operation information, etc. stored in an individual customer information storage unit to obtain demand forecast data D2 with improved forecast accuracy. A power generation plan creation device (not shown) creates an appropriate power generation plan based on the demand forecast data D2".

In addition, in order to improve the management of power generation plants, transactions in a power trading market may be carried out. PTL 3 "executes a transaction plan in response to market trends, fluctuations in demand, and operating conditions of business partners, and determines the amount and timing of orders placed with business partners and markets based on the results."

CITATION LIST

Patent Literatures

PTL 1: International Publication WO2018/037477
PTL 2: Japanese Unexamined Patent Application Publication No. 2009-303411
PTL 3: Japanese Unexamined Patent Application Publication No. 2018-163516

SUMMARY OF INVENTION

Technical Problem

Here, in order to operate the power generation plant more appropriately, it is necessary to coordinate the operation of the power generation plant, the control of power generation, and the buying and selling in a power trading market. In other words, comprehensive operation management of the power generation plant is required. For example, when power demand is high, selling the power to the power trading market may increase a revenue, but the power supply may not be able to keep up.

On the other hand, PTL 1 does not disclose improving the profitability of the power generation plant in cooperation with an external function such as a power market.

Further, PTL 2 and PTL 3 disclose cooperation with an external function such as a power market. However, the following issues exist. In PTL 2, power adjustment is performed to match a system frequency, but comprehensive operation management including an economic point of view is not performed. Further, in PTL 3, although the supply to the power trading market is taken into consideration, an operating status of the corresponding power generation plant is not taken into consideration in the supply. In other words, the above operation management is not a comprehensive operation management that considers both the operation control aspect of the power generation plant and the management aspect such as buying and selling in the power trading market.

In view of the above problems, it is an object of the present invention to comprehensively determine both the operation control of the power generation plant and the buying and selling in the power trading market, and perform the operation management.

Solution to Problem

In order to achieve the above object, the present invention provides a power generation plant operation assistance system that assists the operation of a power generation plant that supplies power to a predetermined power transmission area, including a receiving unit that accepts an area demand amount in a power transmission area to which the power generation plant supplies power, a balance calculation unit that determines whether or not a power selling revenue at the power transmission plant decreases by more than a predetermined standard by use of the area demand amount, a power amount correction unit that creates bid data including an amount of power in the power generation in the power generation plant according to a decrease in the power selling revenue if the power selling revenue decreases, a reserve power correction command unit that outputs a reserve power command for securing a predetermined reserve power in the power transmission area to the power generation plant by use of net reserve power in the power transmission area in the power transmission area, which is specified based on the power supply amount and the area demand amount in the power transmission area, and the power amount included in the bid data, a transmission unit that outputs the bid data to a power exchange system through a network, and an operation command creation unit that creates an operation command for switching the power transmission to the power transmission area to the power transmission area corresponding to contract data if the receiving unit receives the contract data indicating that transaction for the bid data has been contracted from the power exchange system.

The present invention also includes a method using this power generation plant operation assistance system and a computer program product (including a medium) for causing a computer to execute this method.

Further, according to an aspect of the present invention, there is a power generation plant control system that is connected to the power generation plant operation assistance system through a network, and includes a receiving unit that receives the operation command from the power generation plant operation assistance system, and a control unit that creates a control signal for the power generation plant controlled by the power generation plant control system according to the operation command. The operation command in response to the operation command. Here, particularly, it is preferable to shut down the power outage under control of the power generation plant control system. The present invention also includes a method using this power generation plant control system and a computer program product (including a medium) for causing a computer to execute this method.

Advantageous Effects of Invention

According to the present invention, in the power generation plant, since both the operation control aspect and the management aspect are comprehensively considered, more efficient operation management can be performed.

DESCRIPTION OF EMBODIMENTS

An embodiment of the present invention for assisting the operation of a power generation plant will be described below. First, an outline of a function in the present embodiment will be described with reference to FIG. 1. In the present embodiment, power is sold to the power trading market in order to improve the economic balance of the power generation plant or the power company that operates the power generation plant. For this reason, the present example is largely related to the following three elements. That is, the present example is related to a power trading market, a plant operation assistance system 10 that executes the main processing of the present embodiment, and a plant control system/central power supply command system (11a, 11b, 30, 12).

Figure 1:
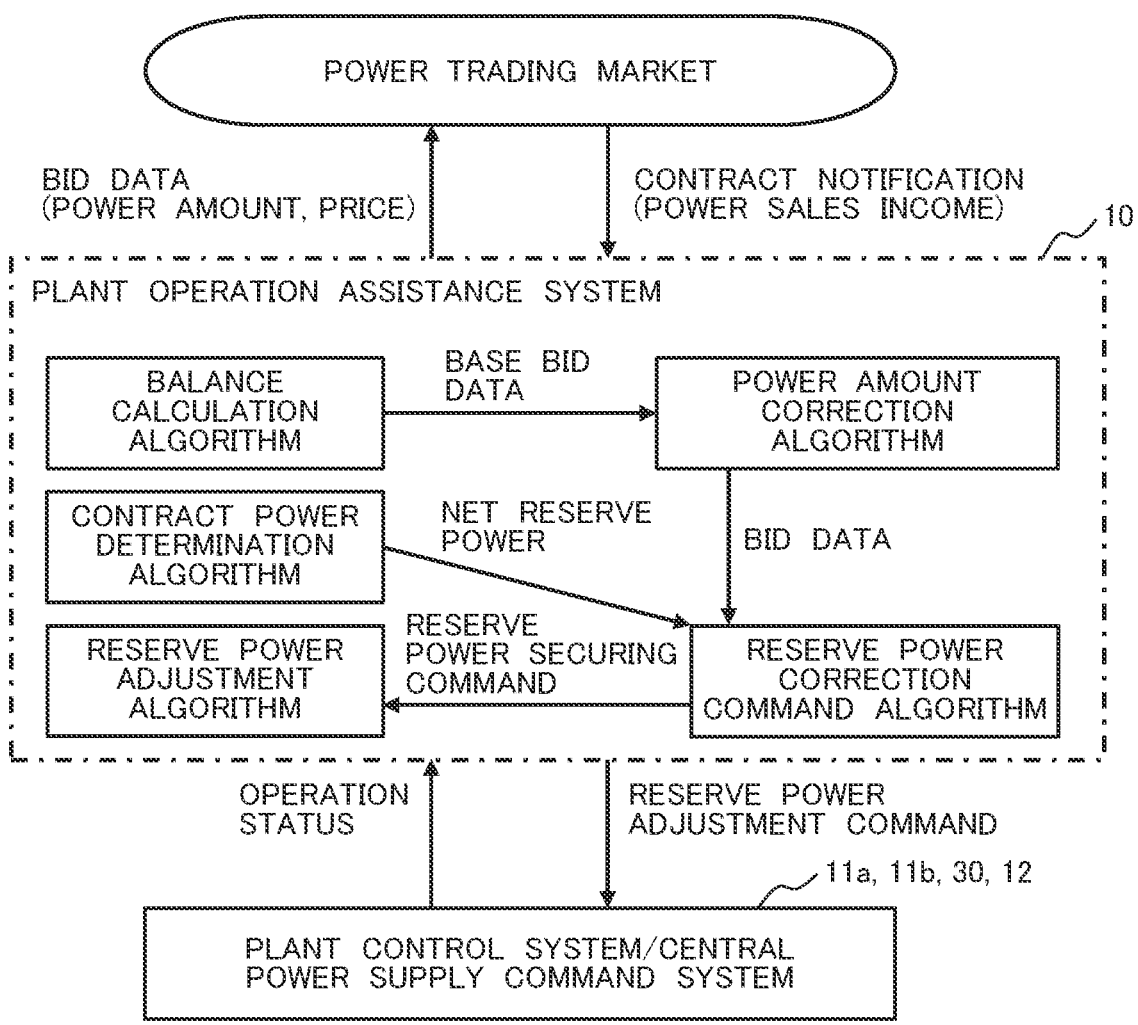
FIG. 1 is a diagram illustrating an outline of a function according to an embodiment of the present invention.

First, an outline of FIG. 1 will be described. In the plant operation assistance system 10, when a target power sales revenue is not satisfied, bid data including the amount of power supplied to the power trading market is calculated in order to make up for the shortage of the power sales revenue in the power trading market.

Moreover, based on the above information, in the plant operation assistance system 10, a reserve power adjustment command is output to an on-site plant control system/central power supply command system (11a, 11b, 30, 12) in order to secure the amount of power. Then, it is calculated and determined whether or not the power generation plant can actually have sufficient reserve power to secure the amount of power. Then, the bid data including the power amount based on a net reserve power value is bid, and then the power sales revenue for the contracted power amount is developed from the power trading market.

Next, a more detailed description of FIG. 1 will be given. In the present embodiment, the plant operation assistance system 10 operated by the power company performs bid processing to the power trading market in consideration of a demand situation of a target power supply area (transmission network). At this time, the plant operation assistance system 10 proceeds with processing in cooperation with plant control systems 11a, 11b, 30 and a central power supply command system 12 that control the power generation plant such as a thermal power plant. It is desirable that the area is under the jurisdiction of power companies such as Hokkaido, Tohoku, Tokyo, Chubu, Hokuriku, Kansai, Chugoku, Shikoku, Kyushu, and Okinawa.

More specifically, the plant operation assistance system 10 determines whether or not to satisfy a target power sales revenue, that is, to bid the power trading market, based on the demand in the power supply area according to the balance calculation algorithm. As a result, when it is determined to bid, the plant operation assistance system 10 calculates the base bid data including the power amount to be bid and a bid price according to the balance calculation algorithm.

In addition, the plant operation assistance system 10 calculates net reserve power of the power generation plant in the power supply area of the power generation plant by use of the demand in each operating condition and area according to a contracted power determination algorithm.

Then, the plant operation assistance system 10 corrects the power amount included in the base bid dace as necessary according to the power amount correction algorithm. This is because the plant operation assistance system 10 uses the result of simulating an operating status of the power generation plant according to the power amount correction algorithm to determine whether or not the power amount included in the base bid dace needs to be corrected, and correct the power amount if necessary. As a result, bid data including the corrected power amount is specified.

Next, the plant operation assistance system 10 determines whether or not the reserve power for the power supply area is secured by the net reserve power according to the reserve power correction command algorithm. The reserve power indicates predetermined reference power such as the minimum power that can maintain the power supply to the power supply area. For this reason, the reserve power includes a certain percentage of the power supplied to the entire power generation plant, power that can back up the dropout of the power generation plant with the maximum output, and the like. Further, it is desirable that this reserve power is stored in a storage device of the plant operation assistance system 10 in advance. As a result, the plant operation assistance system 10 creates a reserve power adjustment command when the reserve power is not secured.

Then, the plant operation assistance system 10 performs the reserve power adjustment process according to the reserve power adjustment command according to the reserve power adjustment algorithm. The details will be described later, but the plant operation assistance system 10 outputs the reserve power adjustment command to the plant control systems 11a, 11b, 30 and the central power supply command system 12 that control the power generation plant such as a thermal power plant, and adjusts the reserve power.

When the above processing is performed, the plant operation assistance system 10 transmits bid data including the amount and price of power to be bid to the power trading market, that is, the power exchange system 20. As a result, when a contract is made in the power trading market, a contract notification is received from the power exchange system 20. As a result, the power company obtains a power selling revenue. When the contract has been established, the plant operation assistance system 10 generates an operation command for changing or adding a power supply destination according to an operation command algorithm (not shown in FIG. 1).

The description of the outline of the function in the present embodiment has been completed, and the details will be described below. First, the system configuration to be the target of the present embodiment will be described with reference to FIG. 2.

Figure 2:
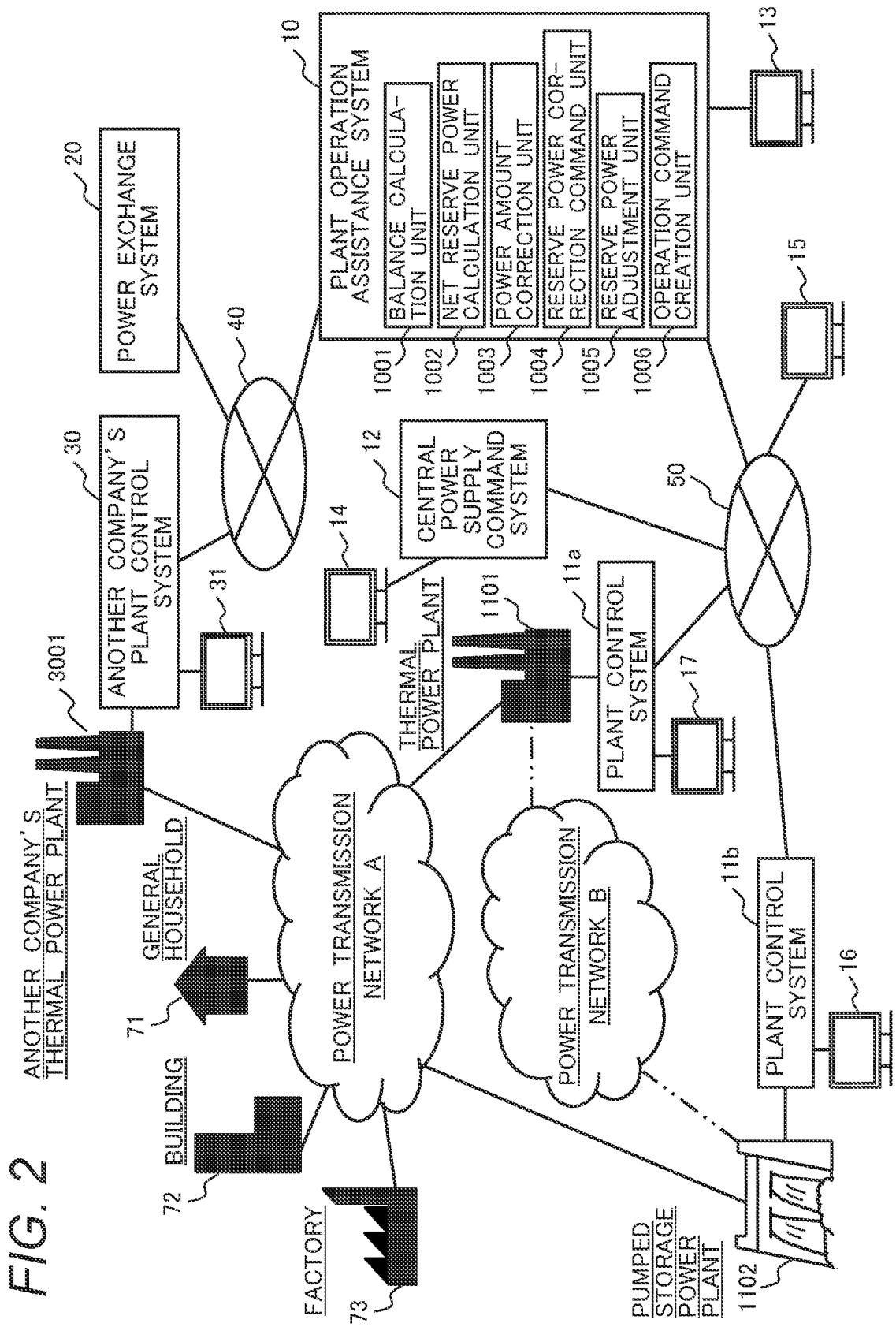
FIG. 2 is a diagram showing a system configuration that is a target of an embodiment of the present invention.

As shown in FIG. 2, a power transmission network A is connected to a general household 71 (house), a building 72, and a factory 73, which are consumers and receives power. The present embodiment will be described on the premise that there are two power companies that supply power to each of these consumers ("power company" and "another company").

As a power generation plant for supplying power to each consumer, a thermal power plant 1101 and a pumped storage power plant 1102 are connected to the power transmission network A. Here, the thermal power plant 1101 and the pumped storage power plant 1102 are power generation plants operated and managed by the same power company, and another company's thermal power plant 3001 operated by another company is also connected to the power transmission network A for supplying power. Further, in the present embodiment, the thermal power plant 1101 and the pumped storage power plant 1102 of the power company are provided with a configuration capable of supplying power to a power transmission network B as well. Further, in the present embodiment, two examples of thermal power plant 1101 and the pumped storage power plant 1102 are shown, but the type and number of power generation plants are not limited to those examples. The fuel for thermal power plants is coal, LNG, etc., regardless of the type.

Here, the thermal power plant 1101 and the pumped storage power plant 1102 are connected to the plant control system 11a and the plant control system 11b, respectively, and their operation is controlled according to commands from those systems. Further, the plant control system 11a and the plant control system 11b are connected to a terminal device 16 and a terminal device 17 used by a controller who is an employee of the power company, respectively.

Further, the plant control system 11a and the plant control system 11b are connected to the central power supply command system 12 installed at a central power supply command center through an intranet 50 of the power company. The central power supply command system 12 generates a power generation command for the power company as a whole by using the operating status of each power generation plant acquired through the plant control system 11a and the plant control system 11b. Then, the plant control system 11a and the plant control system 11b control each power generation plant according to a command from the central power supply command system 12. The terminal device 14 used by a commander is also connected to the central power supply command system 12.

Further, a terminal device 15 used by a commander, an employee of the power company, or the like in the operation of a power generation plant is connected to the intranet 50.

Further, the power company is provided with a plant operation assistance system 10 that executes the main processing of the present embodiment. The plant operation assistance system 10 is connected to the central power supply command system 12, the plant control system 11a, and the plant control system 11b through the intranet 50. The plant operation assistance system 10 outputs information for assisting the operation of the plant, such as an operation plan, to at least one of those connected systems. This operation plan includes supplying power to the power transmission network B as a result of selling power to the power trading market.

Here, in order to execute the processing described above, the plant operation assistance system 10 includes a balance calculation unit 1001, a net reserve power calculation unit 1002, a power amount correction unit 1003, a reserve power correction command unit 1004, a reserve power adjustment unit 1005, and an operation command creation unit 1006. The details of each of those units and the processing using those units will be described later. In addition, the terminal device 13 used by a staff of the power company is also connected to the plant operation assistance system 10. The plant operation assistance system 10 and the central power supply command system 12 may be realized as one device. Further, in the present embodiment, the central power supply command system 12 is allowed to be operated by an organization different from the power company described above.

Further, the plant operation assistance system 10 is connected to an external device through the Internet 40. Examples of the external device include the power exchange system 20 and the plant control system 30 of another company. Here, the power exchange system 20 is a system for realizing power trading in the power trading market, and receives bid data for that purpose from various devices for buying and selling power.

Further, the plant control system 30 of the other company controls the power generation plant in the same manner as the plant control system 11a and the plant control system 11b. Specifically, the other company's plant control system 30 controls the other company's thermal power plant 3001 that supplies power to the transmission network A. Here, the types and numbers of thermal power plants of the other company are not limited to the example shown in FIG. 2. Further, a terminal device 31 used by the controller who is an employee of the other company is also connected to the plant control system 30 of the other company.

Of the devices described above, the plant operation assistance system 10, the plant control system 11a, the plant control system 11b, the power exchange system 20, and the plant control system 30 of the other company can be realized by so-called computers, especially servers. Further, each terminal device (13 to 17, 31) can be realized by a computer such as a personal computer. This includes cellular phones such as smartphones and tablet terminals.

Figure 3:
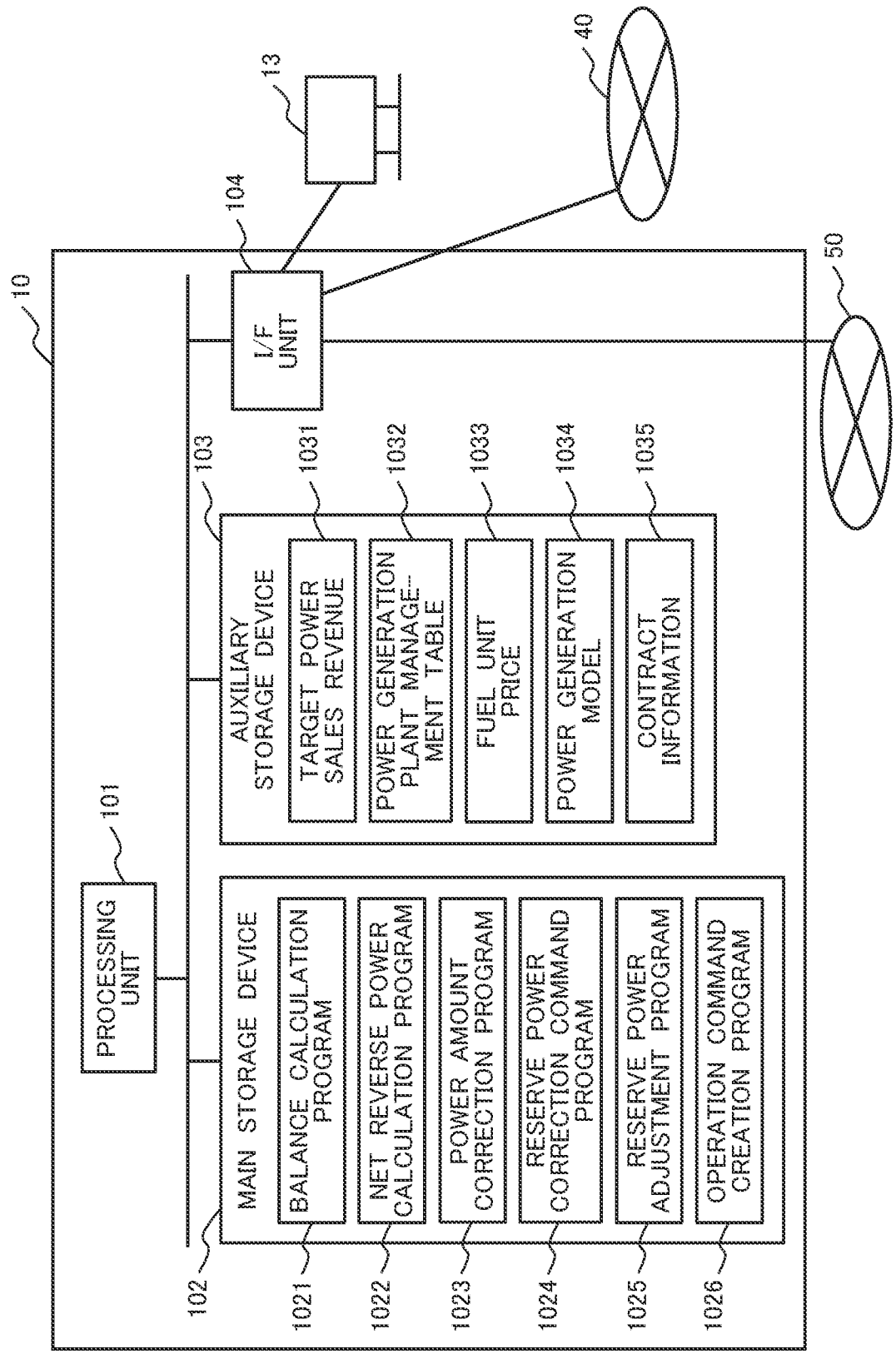
FIG. 3 is a diagram showing a configuration of a plant operation assistance system according to an embodiment of the present invention.

Next, FIG. 3 shows the configuration of the plant operation assistance system 10 that executes the main processing of the present embodiment. The plant operation assistance system 10 is realized by a computer as described above. Therefore, the plant operation assistance system 10 includes a processing unit 101 that performs calculation and processing like a CPU, a main storage device 102 that stores each program, an auxiliary storage device 103 that stores various data, and an I/F unit 104 as an interface with the auxiliary storage device 103, and the external device.

Here, the processing unit 101 executes various processes according to various programs stored in the main storage device 102. In addition, the main storage device 102 stores a balance calculation program 1021, a net reserve calculation program 1012, a power amount correction program 1023, a reserve power correction command program 1024, a reserve power adjustment program 1025, and an operation command creation program 1026. Those programs are programs for realizing each algorithm described in FIG. 1. In addition, the functions of those programs can be realized by the abovementioned balance calculation unit 1001, net reserve power calculation unit 1002, power amount correction unit 1003, reserve power correction command unit 1004, reserve power adjustment unit 1005, and operation command creation unit 1006, respectively. The details of the processes executed by those units will be described later with reference to a flowchart.

Next, the auxiliary storage device 103 stores a target power sales revenue 1031, a power generation plant management table 1032, a fuel unit price 1033, a power generation model 1034, and contract information 1035. The auxiliary storage device can be realized by so-called storage, and may be realized by an external file system connected to the plant operation assistance system 10.

Further, the I/F 104 has a function of connecting to the terminal device 13, the Internet 40, and the intranet 50. In the present embodiment, the I/F 104 is described as one configuration, but may be realized by providing each connection portion to the network such as the terminal device 13, the Internet 40, and the intranet 50. Each configuration of those plant operation assistance system 10 is connected to each other through a communication path such as a bus. In this way, the I/F unit 104 functions as a receiving unit and a transmission unit.

Figure 4:
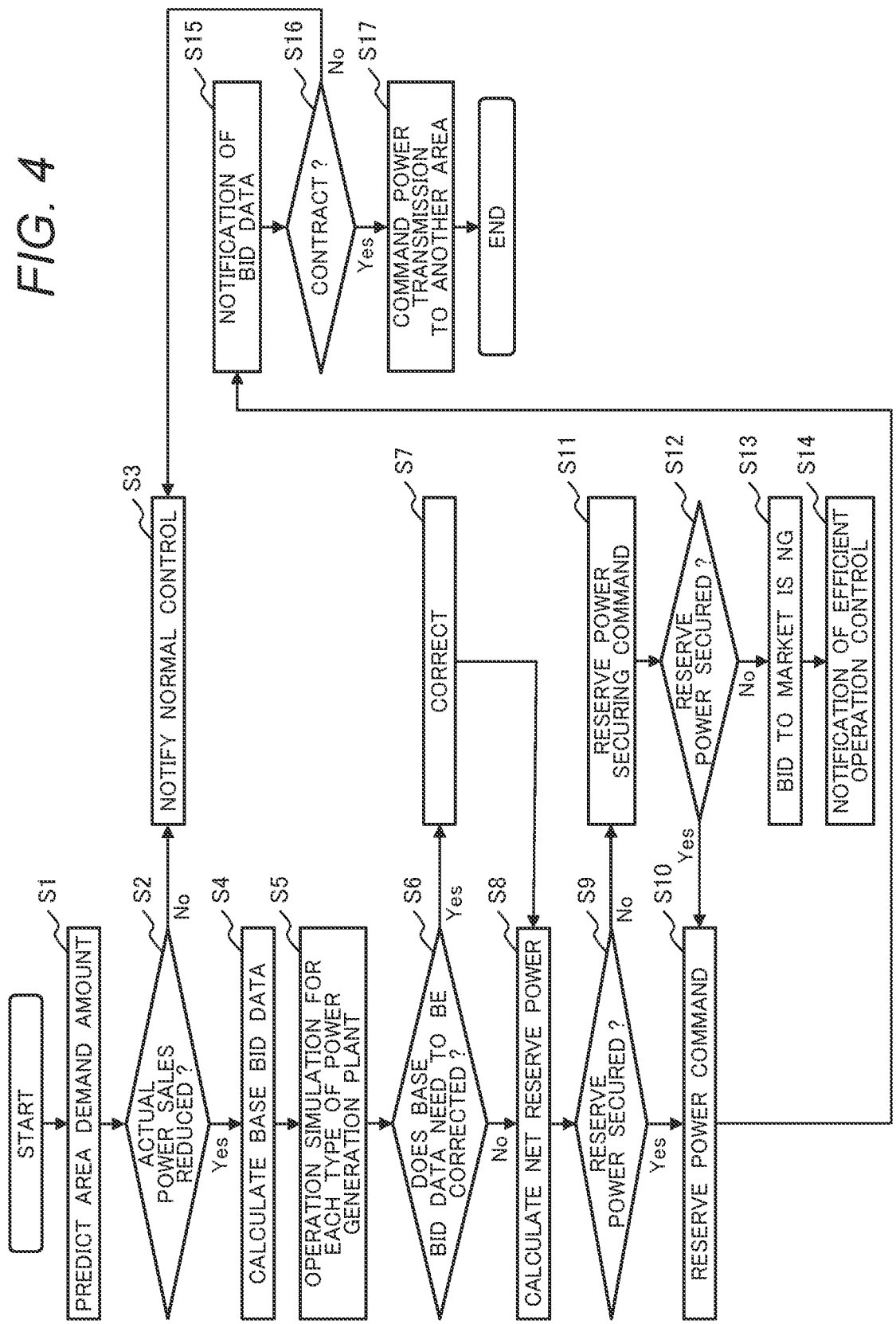
FIG. 4 is flowchart showing processing of the plant operation assistance system according to an embodiment of the present invention.

Next, FIG. 4 shows a flowchart showing the processing of the plant operation assistance system 10 in the present embodiment. Hereinafter, the processing executed by the plant operation assistance system 10 will be described mainly for each unit of the plant operation assistance system 10 shown in FIG. 2.

First, in Step S1, the balance calculation unit 1001 predicts the area demand amount. That is, the balance calculation unit 1001 predicts the demand amount of a demand source (general household 71, building 72, factory 73) to which power is supplied through the power transmission network A. The prediction method for this demand amount is not particularly limited. In addition, it is desirable that the forecast timing of this area demand amount is periodic, such as on a monthly basis. Furthermore, it is desirable that a demand generation time is a certain period ahead of a forecast time. This is because it takes a certain amount of time for a transaction in the power trading market to be completed (contracted).

Next, in Step S2, the balance calculation unit 1001 determines whether or not an actual trading revenue based on the area demand amount predicted in Step S1 reduces with respect to a target power sales revenue 1031 stored in the auxiliary storage device 103. Criteria for determining whether or not there is this reduction include the following items (1) to (3). (1) The actual sales revenue is below the target power sales revenue 1031, (2) The actual sales revenue is below a certain percentage (for example, 90%) of the target power sales revenue 1031, (3) A difference obtained by subtracting a predetermined value from the target power sales revenue 1031 exceeds the actual sales revenue, and so on. In addition, this criterion is not necessarily limited to comparison with the target power sales revenue 1031. For example, the criterion may be compared with the past power sales revenue. Further, in Step S2, the actual trading revenue may be used for the current period or past results.

In this way, in Step S2, it is determined whether or not the determination criteria satisfy a predetermined criterion, that is, reduces more than the predetermined criteria.

As a result of this determination, if the actual power sales revenue does not decrease (No), the process proceeds to Step S3. Then, in Step S3, the operation command creation unit 1006 notifies the plant control systems 11a, 11b, 30 and the central power supply command system 12 that normal operation control is performed. Note that this notification may be omitted without any particular notification.

If the actual power sales revenue is decreased in Step S2 (Yes), the process proceeds to Step S4. In other words, the process for bidding on the power trading market is advanced. Then, in Step S4, the balance calculation unit 1001 calculates the base bid data including the bid price and the power amount based on a difference between the target power sales revenue 1031 and the actual trading revenue.

Figure 5:
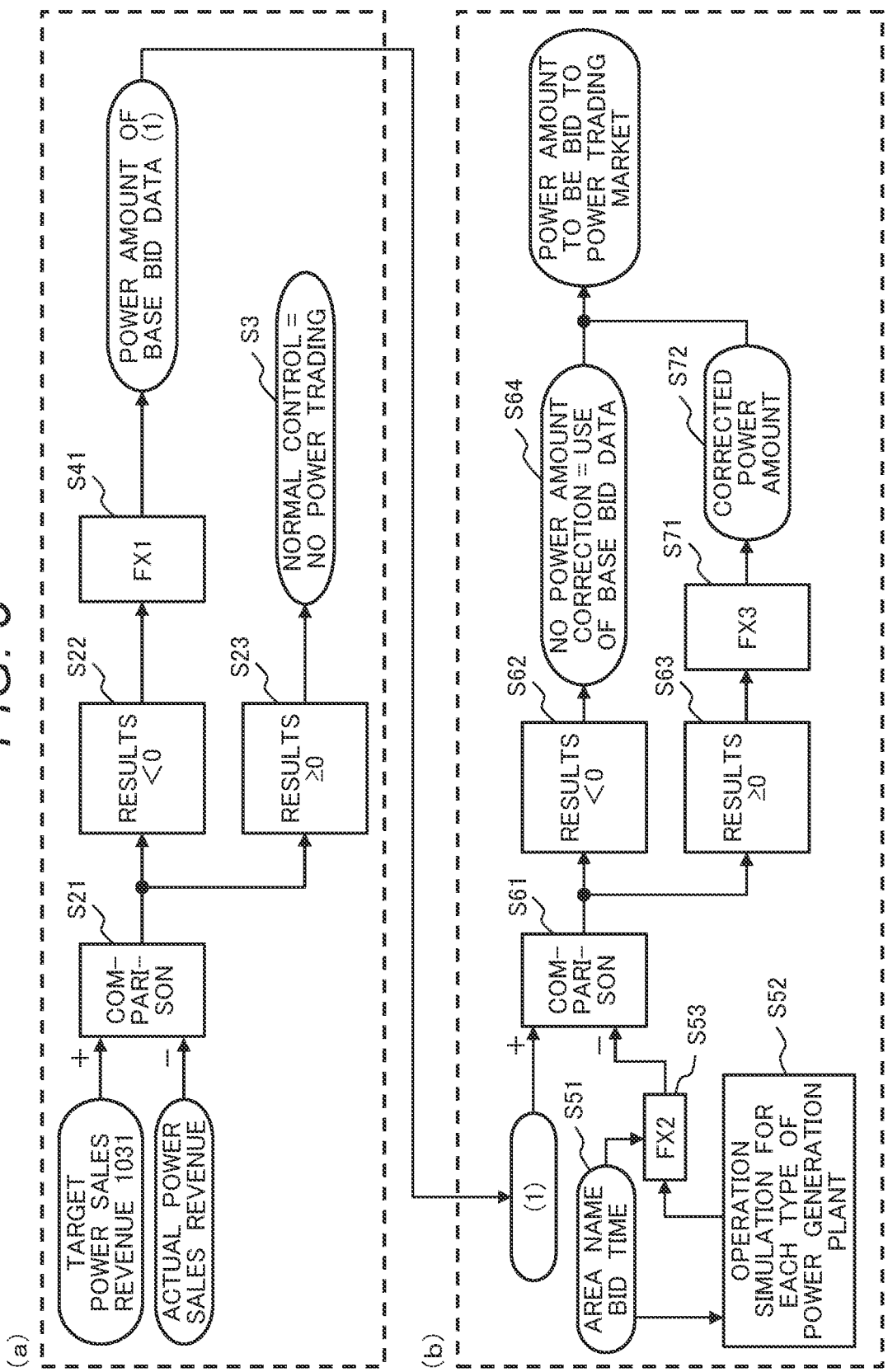
FIG. 5 is a diagram showing a specific example of processing of a balance calculation algorithm (Steps S2 to S4) and a power amount correction algorithm (Steps S5 to S7) according to an embodiment of the present invention.

Here, the details of Steps S2 to S4 will be described with reference to FIG. 5(*a*). Note that FIG. 5(*a*) corresponds to the balance calculation algorithm of FIG. 1. As shown in FIG. 5(*a*), the balance calculation unit 1001 accepts the input of the target power sales revenue 1031 and the actual power sale revenue. Then, the balance calculation unit 1001 compares those revenues with each other and calculates a difference between those revenues. For example, as shown in S21 of FIG. 5(*a*), the target power sales revenue 1031 is set to "+" and the actual power selling revenue is set to "−" for totaling. As a result, if it is negative, that is, if it is <0 (S22), the process proceeds to S41. If the result is 0 or more, that is, ≥0 (S23), there is a normal control, that is, no power trading (S3).

Here, in the case of S22, the process proceeds to S41. That is, the balance calculation unit 1001 calculates the amount of power to be bid on the power trading market by using the power selling revenue/power conversion function (FX1) in consideration of a transaction rate (unit price) of the power trading market. FX1 may be a mathematical formula that can calculate the result of S21, that is, the amount of power that satisfies the shortage of revenue. As a result, the power amount of the base bid data is calculated. In addition, it is desirable that the balance calculation unit 1001 specifies the price of the base bid data by using this power amount and the result of S21.

Further, the calculation of the power amount of the base bid data may be executed as follows. The balance calculation unit 1001 first identifies a difference between the target power sales revenue 1031 and the actual trading revenue, that is, a difference (similar to S21). Next, the balance calculation unit 1001 calculates the amount of power by dividing this difference by a unit price per unit power determined in advance. Then, the balance calculation unit 1001 calculates the base bid data including the price indicated by this unit price and the calculated power amount. Further, it is desirable that the balance calculation unit 1001 includes a demand generation time of the area demand amount in Step S1 in the base bid data. The method of calculating the base bid data is not limited to those examples, and other methods may be used.

Next, in Steps S5 to S7, the base bid data is corrected in consideration of the operating status of the power generation plant to create the bid data. That is, the processing according to the power correction algorithm shown in FIG. 1 is executed. In the present embodiment, the correction and the necessity determination of the correction are executed, but those processes may be omitted. In this case, the base bid data will be used as the bid data.

First, in Step S5, the power amount correction unit 1003 executes an operation simulation for each area, that is, the type of the power generation plant of the power transmission network A. Then, in Step S6, the power amount correction unit 1003 determines whether the power amount of the base bid data needs to be corrected by using the result of the operation simulation. As a result, if correction is required (Yes), the process proceeds to Step S7, and the power amount correction unit 1003 performs correction. If correction is not required in Step S6 (No), the process proceeds to Step S8.

Hereinafter, the processing of Steps S5 to S7, that is, the details of processing according to the power correction algorithm will be described in detail with reference to FIG. 5(*b*). The power amount correction unit 1003 first accepts the input of the corresponding area name (power transmission network A) and bid time (demand period of area demand amount) (S51). This may be accepted by the terminal devices 13 and 15 that have been input from the staff, or determined by the power amount correction unit 1003 using the processing results in each step described above.

Next, the power amount correction unit 1003 specifies the power generation plant types of the thermal power plant 1101, the pumped storage power plant 1102, and the thermal power plant 3001 of another company from the power generation plant management table 1032 stored in the auxiliary storage device 103. It is assumed that the power generation plant management table 1032 records management data such as the type and number of power generation plants that supply power to the power transmission network A. The other companies' thermal power plant 3001 may be excluded from the above processing. Then, the power amount correction unit 1003 executes an operation simulation by using the area name, the bidding time, and the power generation plant type (S52).

A specific example of the operation simulation will be described with reference to FIG. 6 (particularly (b)). As a premise, as the type of power generation plant in the power generation plant management table 1032, the type of the power generation plant for each power source such as "pumped storage power generation", "coal-fired machine", "oil-fired machine", and "LNG-fired machine" as shown in FIG. 6(*b*) is recorded.

Figure 6:
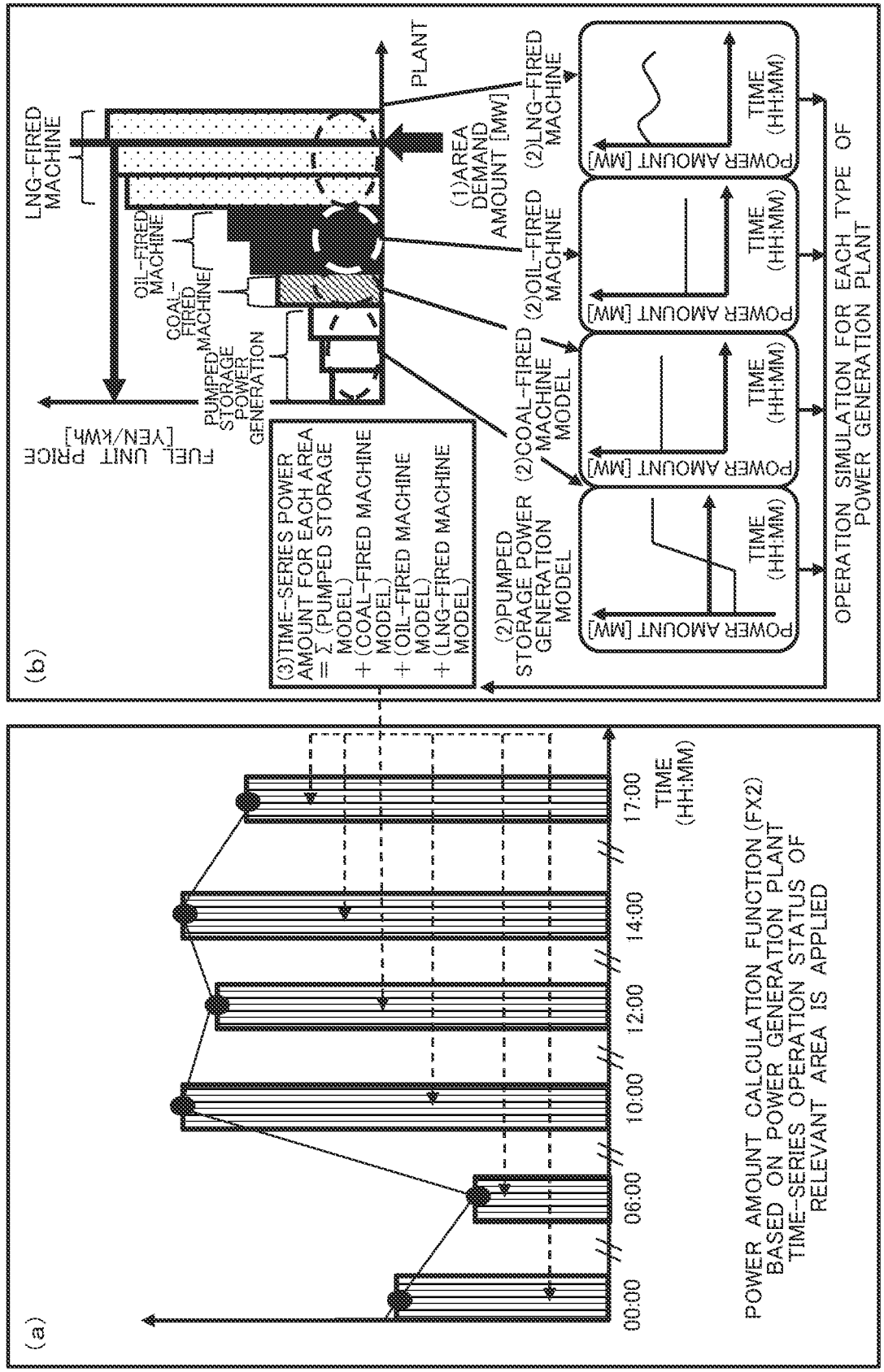
FIG. 6 is a diagram illustrating a specific example of an operation simulation according to an embodiment of the present invention.

First, the power amount correction unit 1003 acquires the area demand amount ((1) of FIG. 6(*b*)) of each area, which can be a supply destination according to the area demand amount predicted in Step S1 and the transaction result in the power trading market. Here, the area demand amount of each area may be calculated by executing the same process as in Step S1 in each of the other areas, or may be acquired from another device.

Next, the power amount correction unit 1003 obtains an integrated value of the time-series power amount data by using each power generation model 1034 in the form of starting the power generation plants in the order of relatively low fuel unit price 1033 for each area including the relevant area. In the example of FIG. 6, the operation simulation is executed in the order of (2) "pumped storage power generation model", "coal-fired power generation model", "oil-fired power generation model", and "LNG-fired power generation model". Here, the power amount correction unit 1003 may execute this operation simulation based on the fuel unit price and by using a merit order function which is an algorithm for determining the start-up plant according to the power demand. It is assumed that each fuel unit price 1033 and the power generation model 1034 used in this process are stored in the auxiliary storage device 103. However, the fuel unit price 1033 may be included in the power generation plant management table 1032.

Then, the power amount correction unit 1003 obtains this integrated value as the time-series power amount of each area ((3) in FIG. 6(*b*)). The reason for executing the simulations in the above order is to increase profitability when bidding and contracting on the power trading market of the relevant power generation plant. Up to this point, each numerical value has been calculated for each area other than the relevant area, but the area may narrow down to the relevant area and calculate those numerical values.

By the above processing, the time-series power amount of the power generation plant in the relevant area shown in FIG. 6(*a*) is calculated. The time-series power amount for each area can be saved as the power amount data for each time zone of the power amount calculation function based on the plant time-series operation status of the relevant area to build the power calculation function (FX2).

With the above, the detailed description of executing the operation simulation has been completed (S52), the process returns to FIG. 5, and specific examples of Steps S6 to S7 will be described. The power amount correction unit 1003 applies FX2 which is a power amount calculation function based on the plant time-series operation status of the relevant area with respect to the power amount of the relevant area (power transmission network A) among the time-series power amounts as a result of the operation simulation. Then, the power amount correction unit 1003 calculates the simulation result power amount (S53).

Then, the power amount correction unit 1003 compares the power amount of the base bid data with the power amount of the simulation result as the process of Step S6 (S61). For example, in S61 of FIG. 5(b), the power amount correction unit 1003 sets the power amount of the base bid data as "+" and the simulation result power amount as "−" for totaling. As a result, if it is negative, that is, if it is <0 (S62), the process proceeds to S641. If the result is 0 or more, that is, ≥0 (S63), the power amount correction unit 1003 executes the correction in S71 corresponding to Step S7.

S64 indicates that it is not necessary to correct the power amount of the base bid data, that is, the base bid data is used as the bid data (transition from Step S6 to S8). In S71, the power amount correction unit 1003 calculates a corrected power amount of the power amount of the base bid data based on a power generation plant operating rate in the relevant area by the correction function (FX3) that takes into account a transaction rate of the power amount trading market. Here, the power generation plant operating rate can be specified by reading from the power generation plant management table 1032. With the above, the corrected power amount (S72) is specified.

By the above processing, the amount of power to be bid on the power trading market, that is, the amount of power of the bid data to be transmitted to the power exchange system 20 is specified. The above is the description up to Step S7, that is, the processing according to the power amount correction algorithm. In this process, the power amount correction unit 1003 determines whether or not correction is necessary, according to a difference (S61) between the power amount of the area obtained from the power calculation function (FX2) based on the plant time-series operation status of the relevant area and the power amount of the base bid data. In other words, when the power amount of the base bid data is larger than the power amount calculated by the power amount calculation function (FX3), it is assumed that the power amount of the relevant area is insufficient for the demand, and therefore the power amount correction unit 1003 does not correct the power amount of the base bid data.

On the other hand, when the power amount of the base bid data is smaller than the power amount calculated by the power amount calculation function (FX2), it is assumed that the power amount of the relevant area is satisfied with respect to the demand. Therefore, the power amount correction unit 1003 uses a correction function (FX3) that considers a transaction rate of the power amount trading market to correct the power amount to be bid on the power trading market at a high plant operating rate in the relevant area so as to reduce the power amount of the base bid data, and calculates the corrected power amount. With the above, a description of the processing according to the power correction algorithm, that is, the processing of Steps S5 to S7 has been completed, the process returns to FIG. 4, and Step S8 and subsequent steps will be described.

In Step S8, the net reserve power calculation unit 1002 calculates the net reserve power using the following (Ex. 1).

Net reserve power=Σ total power in the relevant area−Σ power demand {(contracted power amount based on the contracted power determination algorithm)+(reactive power of the power generation plant including the fluctuation of renewable energy)} (Ex. 1)

The (Ex. 1) means that the net reserve power is a value obtained by subtracting the power demand and the reactive power of a reference value from the total power amount (power supply amount) of the area. This means securing the amount of power required for operation in the power generation plant.

Here, the total power of the relevant area is a sum of the contracted power of the relevant area, that is, the consumers of the power transmission network A (general household 71, building 72, factory 73, etc.), and the net reserve power calculation unit 1002 calculates the power by using the contract information 1035 stored in the auxiliary storage device 103.

Further, the contracted power amount based on the contracted power determination algorithm is specified by dividing the relevant area into multiple "zones" and calculating the power amount according to the characteristics of the zones. That is, each zone has characteristics of an industrial area, a commercial area, and a residential area. Then, the net reserve power calculation unit 1002 calculates the power amount for each zone according to the contracted power determination algorithm determined by the characteristics. At this time, the net reserve power calculation unit 1002 calculates the power amount for each zone using the characteristic information for the zone recorded in the contract information 1035 as a parameter. As a result, the net reserve power calculation unit 1002 calculates the sum of those power amounts as the contracted power amount based on the contracted power determination algorithm.

Further, the net reserve power calculation unit 1002 calculates the reactive power of the power generation plant including the fluctuation amount of renewable energy (renewable energy) by using the weather prediction information of the area input through the Internet 40. Specifically, the following (Ex. 2) is used.

Reactive power of each power including the fluctuation of renewable energy=Σ reactive power of adjustment power source+Σ reactive power of reserve power source (Ex. 2)

Here, each requirement of (Ex. 2) is specified by the net reserve power calculation unit 1002 using the following (Ex. 3) and (Ex. 4).

Σ adjustment power source capacity=Σ existing operating LNG thermal machine+Σ standby LNG thermal machine+Σ shutdown LNG thermal machine (Ex. 3)

Σ reserve power source capacity=certain percentage of the total power source capacity of each area power company (can be approximated by the power source capacity that can back up the maximum thermal power machine of power company dropout in each area) (Ex. 4)

Here, the numerical values of pumped storage power generators and the like other than the LNG thermal power plant of (Ex. 3) are also included in the same manner. Then, those numerical values can be identified by the net reserve power calculation unit 1002 from the power generation plant management table 1032. Further, the numerical value of (Ex. 4) can be specified by the net reserve power calculation unit 1002 by predetermining the numerical value in advance and storing the value in the auxiliary storage device 103.

The reactive power of the adjustment power source includes pumping of pumped storage, that is, motor driving power. Further, the reactive power of the reserve power source may be stored in the auxiliary storage device 103 in advance, or may be calculated by the net reserve power calculation unit 1002 each time according to a predetermined algorithm. With the above, the description of Step S8 has been completed. Here, in the present embodiment, the plant operation assistance system 10 has the net reserve power calculation unit 1002, but the central power supply command system 12, the plant control system 11a, and the plant control system 11b may have the net reserve power calculation unit 1002. In this case, the plant operation assistance system 10 receives the net reserve power through the Internet 40 or the intranet 50.

Figure 7:
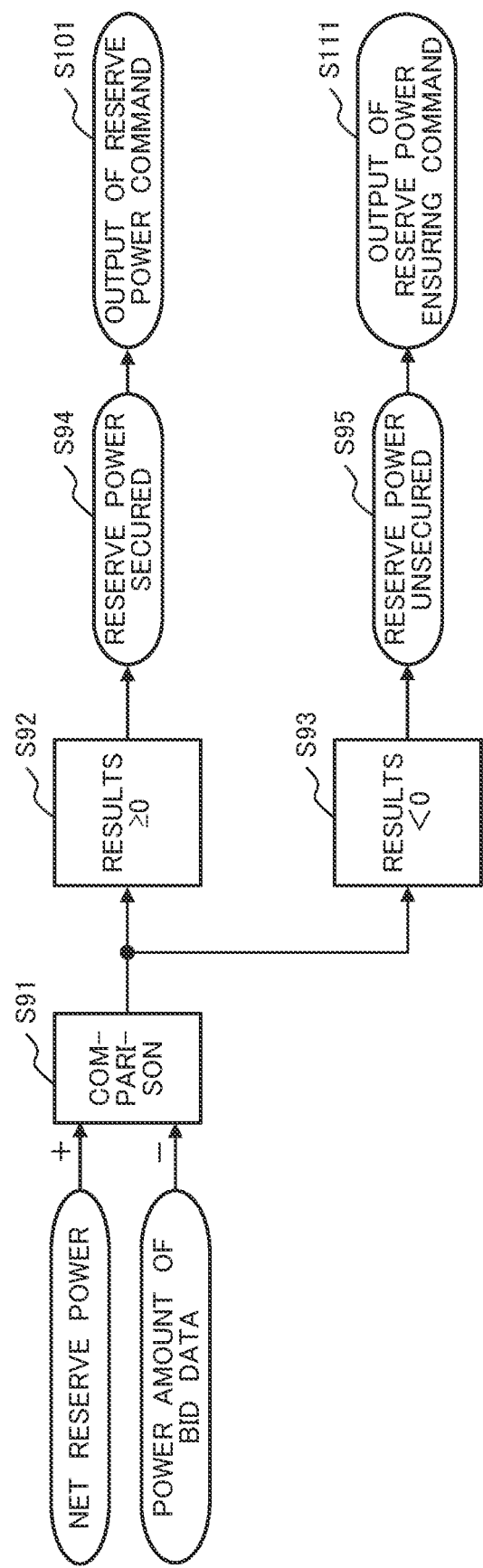
FIG. 7 is a diagram showing a specific example of processing of a reserve power correction command algorithm (Steps S9 to S11) according to an embodiment of the present invention.

Next, the processing according to Steps S9 to S11, that is, processing according to the reserve power correction command algorithm of FIG. 1 will be described. First, in Step S9, the reserve power correction command unit 1004 compares the net reserve power calculated in Step S8 with the power amount included in the bid data, and determines whether the reserve power is secured. That is, the reserve power correction command unit 1004 determines whether the net reserve power is larger and the power amount of the bid data is included in its range. As a result, if the reserve power is secured (Yes), the process proceeds to Step S10, and the reserve power correction command unit 1004 outputs a reserve power command. If the reserve power is not secured (No), the process proceeds to Step S11, and the reserve power correction command unit 1004 outputs a reserve power securing command. Specific examples of those processes will be described with reference to FIG. 7.

First, as shown in S91, the reserve power correction command unit 1004 adds up the net reserve power as "+" and the power amount of the bid data as "−". As a result, if the result is 0 or more, that is, ≥0 (S92), the process proceeds to S94. That is, the reserve power correction command unit 1004 determines that the reserve power is secured by the net reserve power. Then, the reserve power correction command unit 1004 receives this result and outputs a reserve power command (S101).

Further, in the case of minus, that is, in the case of <0 (S93), the process proceeds to S95. That is, the reserve power correction command unit 1004 determines that the reserve power is not secured by the net reserve power (the reserve power is not secured). Then, the reserve power correction command unit 1004 receives this result and outputs the reserve power or Kubo command (S111).

With the above, the description of processing according to Steps S9 to S11, that is, the reserve power correction command algorithm in FIG. 1 has been completed, and the processing according to the reserve power adjustment algorithm in Steps S12 to S14 will be described. In Step S12, the reserve power adjustment unit 1005 executes the reserve power adjustment process in accordance with the reserve power securing command, and as a result, determines whether the reserve power has been secured. As a result, if the reserve power is secured (Yes), the process proceeds to Step S10. If the reserve power is not secured (No), the process proceeds to Step S13. In Step S13, the reserve power adjustment unit 1005 determines that the bid to the power trading market, that is, the transmission of the bid data to the power exchange system 20 is NG. Further, in Step S14, the operation command creation unit 1006 outputs a notification for execution of an efficient operation in the power generation plant to the central power supply command system 12, the plant control system 11a, and the plant control system 11b. As will be described later, Step S14 may be executed by the central power supply command system 12 that has received the reserve power securing notification from the operation command creation unit 1006.

The reason for this processing is that the reserve power cannot be secured even in Step S12. This is because it is necessary to improve the output of the nuclear power generation plant, avoid the shutdown of the power generation plant, and operate the power generation plant more efficiently by energy saving operation. In particular, it is possible to prevent a power outage when avoiding a power generation plant outage. This power outage prevention (shutdown avoidance) will be described later as the control contents of the plant control system 11a and the plant control system 11b.

Here, a specific example of the process according to the reserve power adjustment algorithm in Steps S12 to S14 will be described with reference to FIGS. 8 and 9. In addition, here, some Steps S10 and S15 are also referred to.

Figure 8:
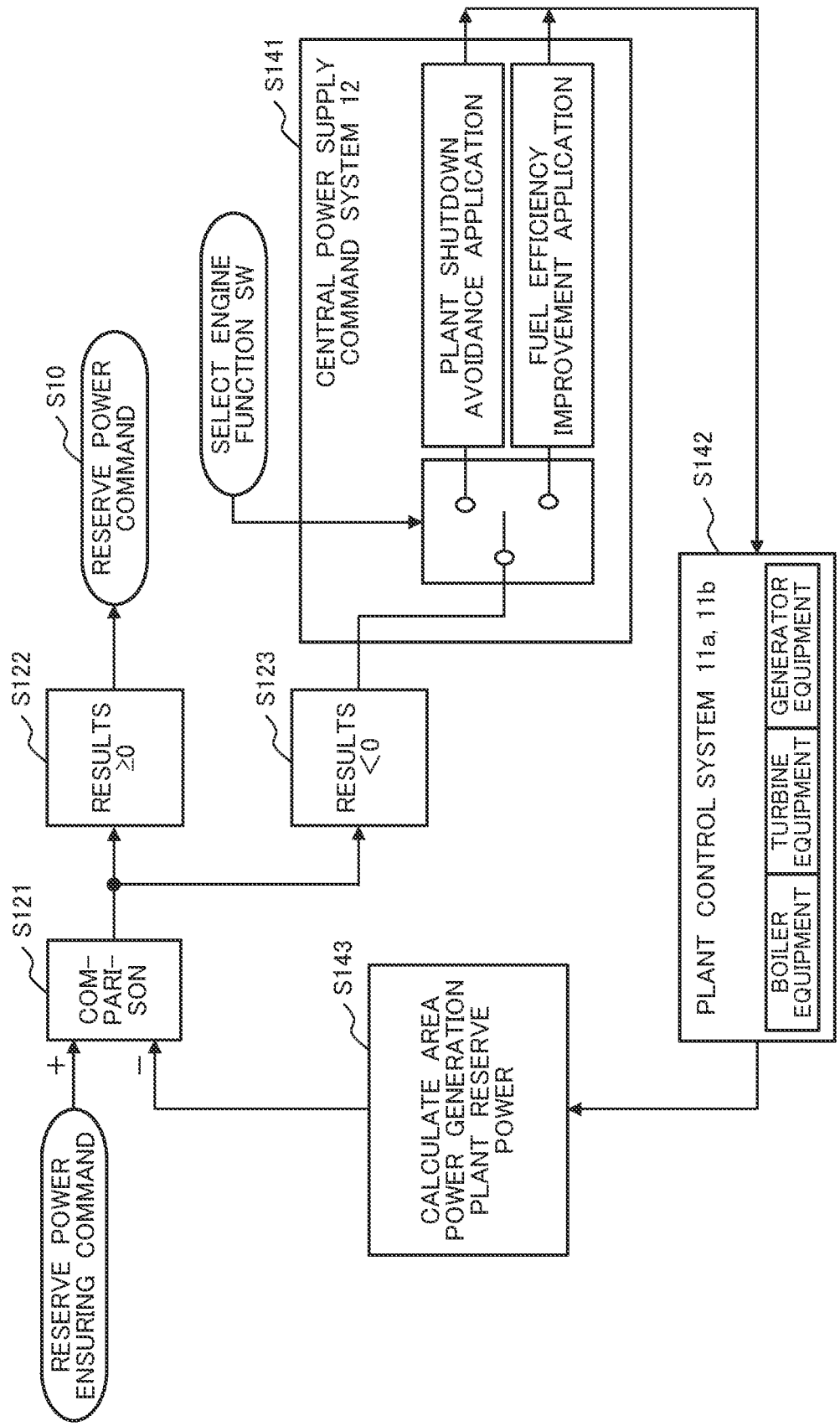
FIG. 8 is a diagram showing a specific example of processing of a reserve power adjustment algorithm (Steps S12 to S14) according to an embodiment of the present invention.

As shown in FIG. 8, the reserve power securing command is output in Step S11. The reserve power adjustment unit 1005 compares the power required to secure the reserve power included in the reserve power securing command with the reserve power of the area power generation plant, that is, the actual reserve power (S121). This corresponds to Step S12, but for example, will be processed as follows. As shown in S121, the reserve power adjustment unit 1005 adds up the power included in the reserve power securing command as "+" and the area power generation plant reserve power as "−". As a result, if the result is 0 or more, that is, ≥0 (S1222), the process proceeds to S101. That is, assuming that the actual reserve power is secured, the operation command creation unit 1006 outputs the reserve power command in Step S10. If it is negative, that is, if <0 (S123), the process proceeds to S141. In this example, the operation command creation unit 1006 transmits a reserve power securing command to the central power supply command system 12.

In this S141, that is, in Step S14 of the flowchart, the central power supply command system 12 receives the reserve power securing command. Then, the central power supply command system 12 activates the engine function selection SW according to the power required to secure the reserve power included in the reserve power securing command. That is, either the plant shutdown avoidance application or the combustion efficiency improvement application is activated depending on the amount of power required to secure the reserve power. That is, the generation of the control signal for avoiding a power failure and the generation of the control signal for improving the combustion in the power generation plant as compared with the normal operation are switched. In this case, if the power required to secure the reserve power is greater than a predetermined value, it is desirable to activate the plant shutdown avoidance application and proceed to Step S13 to determine that the bid to the market is NG.

Here, the plant shutdown avoidance application and the combustion efficiency improvement application respectively avoid the shutdown or improve the combustion efficiency for the power generation plant so as to generate the power required to secure the reserve power included in the reserve power securing command under control. To this end, the plant shutdown avoidance application generates a control signal to avoid power outages in the power transmission network A. Combustion efficiency improvement applications also generate control signals that improve combustion in power generation plants over normal operation.

Figure 9:
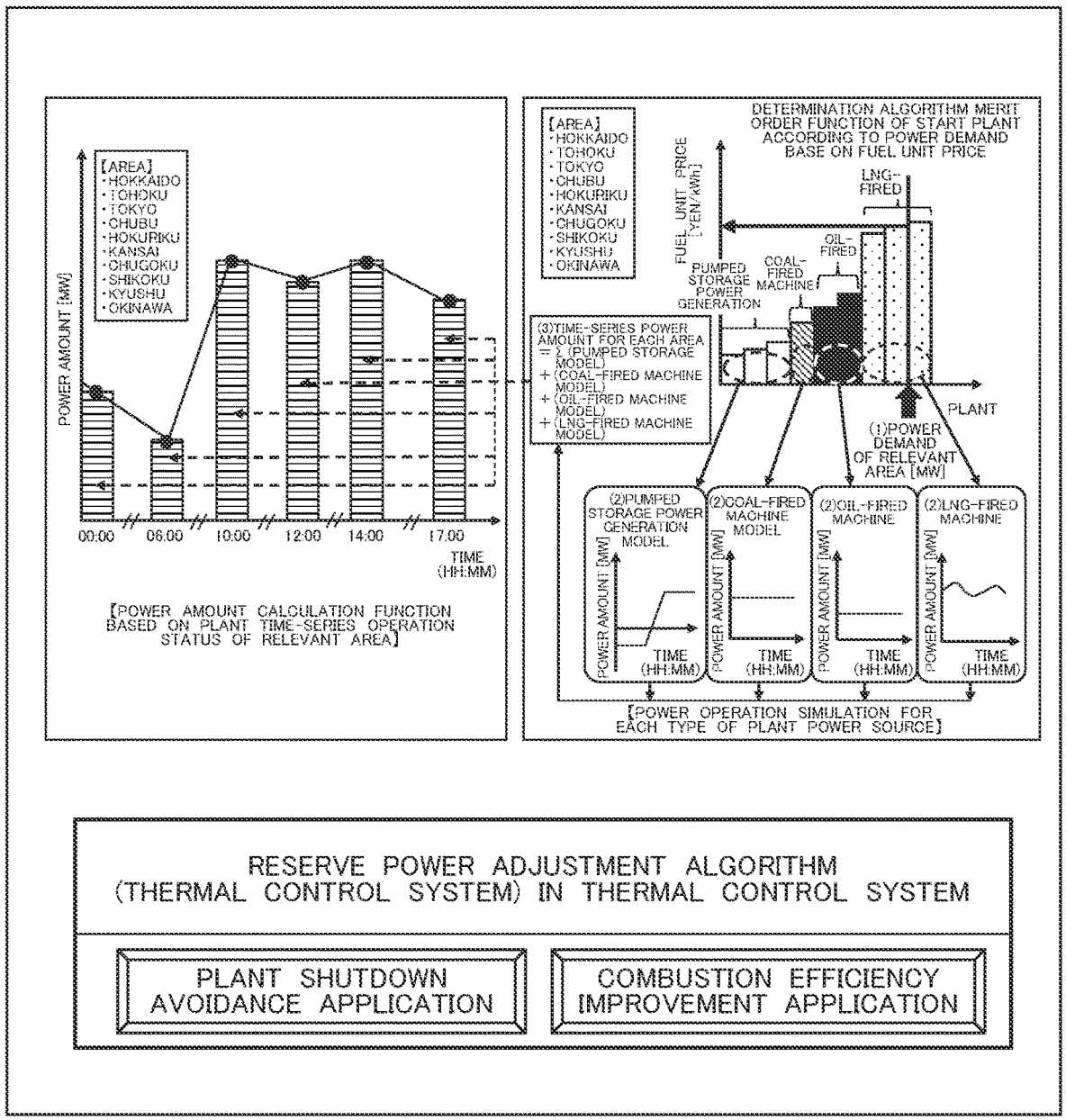
FIG. 9 is a diagram showing an example of a display screen according to an embodiment of the present invention.

Further, at this time, it is desirable that the terminal device 14 of the central power supply command system 12 displays a display screen shown in FIG. 9. At an upper part of this display screen, the content of processing according to the same power amount correction algorithm as in FIG. 6 is displayed. In addition, a plant shutdown avoidance application selection button or a combustion efficiency improvement application selection button is displayed at the bottom. As a result, instead of an engine function selection SW, the application to be operated may be specified according to the designation of the selection button from the user for the terminal device 14. At this time, the user can select the application while checking the upper part of the display screen.

Further, when the engine function selection SW is activated, the plant shutdown avoidance application selection button or the combustion efficiency improvement application selection button may be displayed so that it can be determined which application is operating. Then, the central power supply command system 12 outputs an operation control command to each of the plant control systems 11a and 11b according to the processing in any of the applications. The reserve power adjustment unit 1005 of the plant operation assistance system 10 may execute S141.

In response to the operation control command, the plant control systems 11a and 11b control each facility of the power generation plant controlled by the boiler equipment, the turbine equipment, and the generator equipment, in accordance with the operation control command (S142). Then, the plant control systems 11a and 11b transmit the operation status of each power generation plant according to the control to the plant operation assistance system 10 through the intranet 50.

Then, the reserve power adjustment unit 1005 of the plant operation assistance system 10 calculates the reserve power of the area power generation plant using the operating status (S143). Then, the operation returns to S121. As described above, the processing according to the reserve power adjustment algorithms of Steps S12 to S14 shown in FIG. 8 is loop processing. For that reason, if the reserve power cannot be secured even after performing S123 to S143 more than a certain number of times, it is desirable to change the processing to S122. That is, in Step S12, the reserve power adjustment unit 1005 proceeds to Step S13 if the reserve power cannot be secured even if the reserve power adjustment process is executed a certain number of times or more. In this case, the processing of Step S14 is executed in Step S12.

In the processing according to the above reserve power adjustment algorithm, the difference between the reserve power securing command and the actual reserve power is calculated. In addition, if the reserve power securing command is larger than the actual reserve power, it is determined that the reserve power is secured at each power generation plant at the site. Therefore, the reserve power command value is used as the net reserve power value. As a result, the amount of power based on the net reserve value is finally bid on the power trading market. Next, returning to FIG. 4, this content will be described.

That is, in Step S15, the operation command creation unit 1006 notifies the power exchange system 20 of the bid data including the power amount and the price calculated as described above through the Internet 40. Then, in Step S16, the I/F unit 104 receives the contract data indicating the contract result from the power exchange system 20, and the operation command creation unit 1006 determines whether the contract has been executed. As a result, if there is no execution (No), the process returns to Step S3. If the contract has been executed, the process proceeds to Step S17.

In Step S18, the operation command creation unit 1006 transmits a command to the central power supply command system 12, the plant control system 11a, and the plant control system 11b to transmit power to another area (power transmission network B). At this time, the operation command creation unit 1006 notifies the plant control system 11a and the plant control system 11b to obtain the power generation amount obtained by adding the power amount of the contracted bid data to the demand amount. In addition, the operation command creation unit 1006 transmits a command to the central power supply command system 12 to control the power generated by the thermal power plant 1101 and the pumped storage power plant 1102 to be transmitted to the power transmission network B at a substation.

As a result, among the power generated by the thermal power plant 1101 and the pumped storage power plant 1102 of the power transmission network A, the power of the bid data, that is, the contracted power is transmitted to the transmission network B. Therefore, the relevant power company can make up for the decrease in power sales revenue in the power transmission network A.

Note that the bid data in Step S15 may be established in a range of power and price, and within a range of the contract in the power exchange system 20, that is, a range. Further, the width may specify only the lower limit or the upper limit.

With the above, the description of the processing (FIG. 4) of the plant operation assistance system 10 (FIG. 4) in the present embodiment has been completed. Next, the control contents of the plant control system 11a and the plant control system 11b regarding efficient operation including avoidance of shutdown of the power generation plant will be described. Here, it is assumed that the efficient operation control is notified from the plant operation assistance system 10 in Step S14 to the plant control system 11a and the plant control system 11b. However, as described above, the notification of efficient operation control may be output from the central power supply command system 12.

Figure 10:
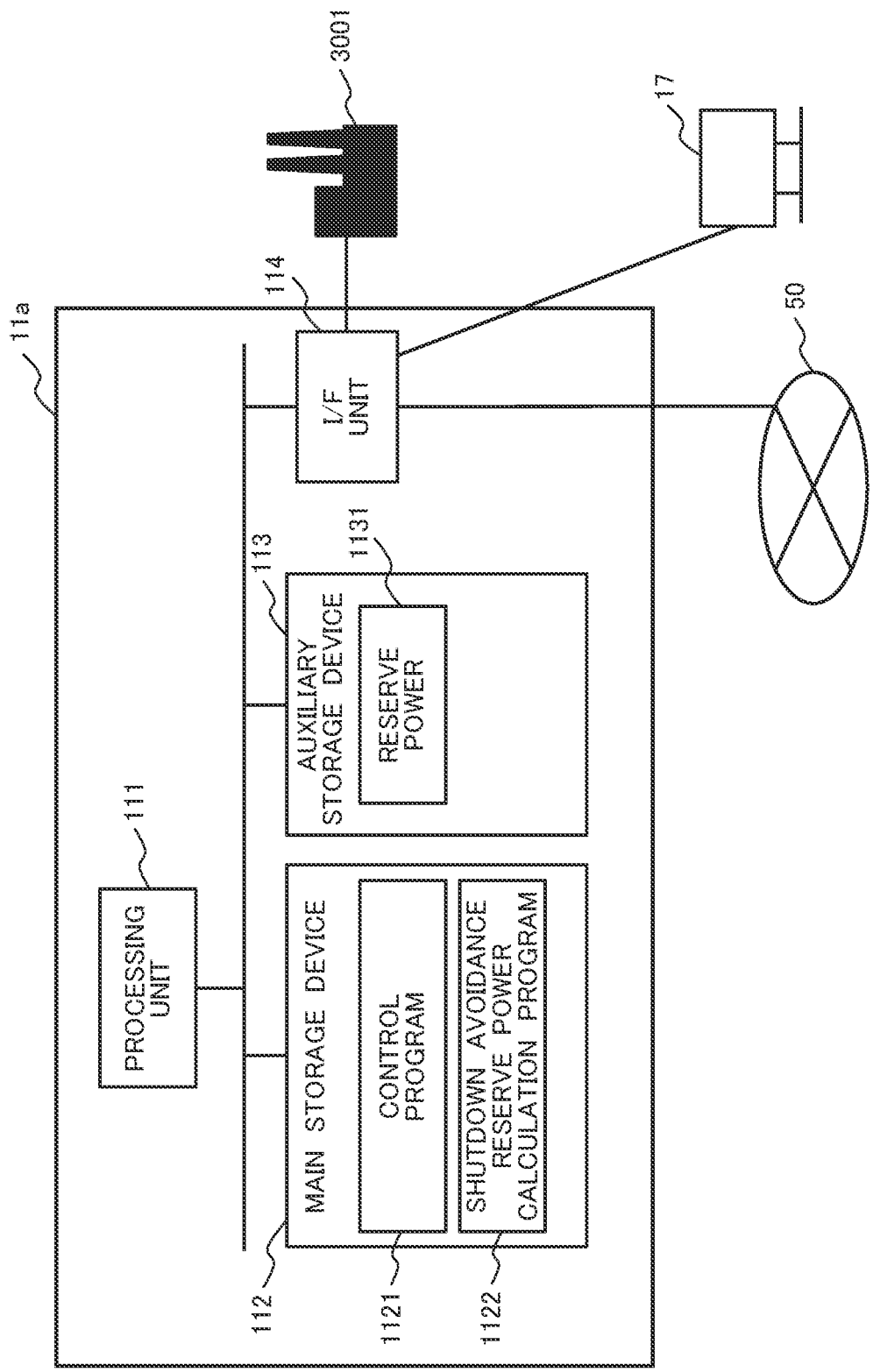
FIG. 10 is a diagram showing a configuration of a plant control system according to an embodiment of the present invention.

First, FIG. 10 shows the configuration of the plant control system 11a. The same applies to the plant control system 11b. As mentioned above, the plant control system 11a is realized by a computer. Therefore, like the plant operation assistance system 10, the plant control system 11a has a processing unit 111, a main storage device 112, an auxiliary storage device 113, and a I/F unit 114. Those functions are the same as those of the plant operation assistance system 10. However, the I/F unit 114 is connected to the intranet 50, the terminal device 17, and the thermal power plant 3001 of another company to be controlled.

The main storage device 112 of the plant control system 11a stores a control program 1121 and a shutdown avoidance reserve force calculation program 1122. Therefore, the processing unit can function as a control unit and a shutdown avoidance reserve power calculation unit. Each of those units may be realized as hardware. Further. The auxiliary storage device 113 stores reserve power 1131 that can be identified in Step S10 of FIG. 4.

Figure 11:
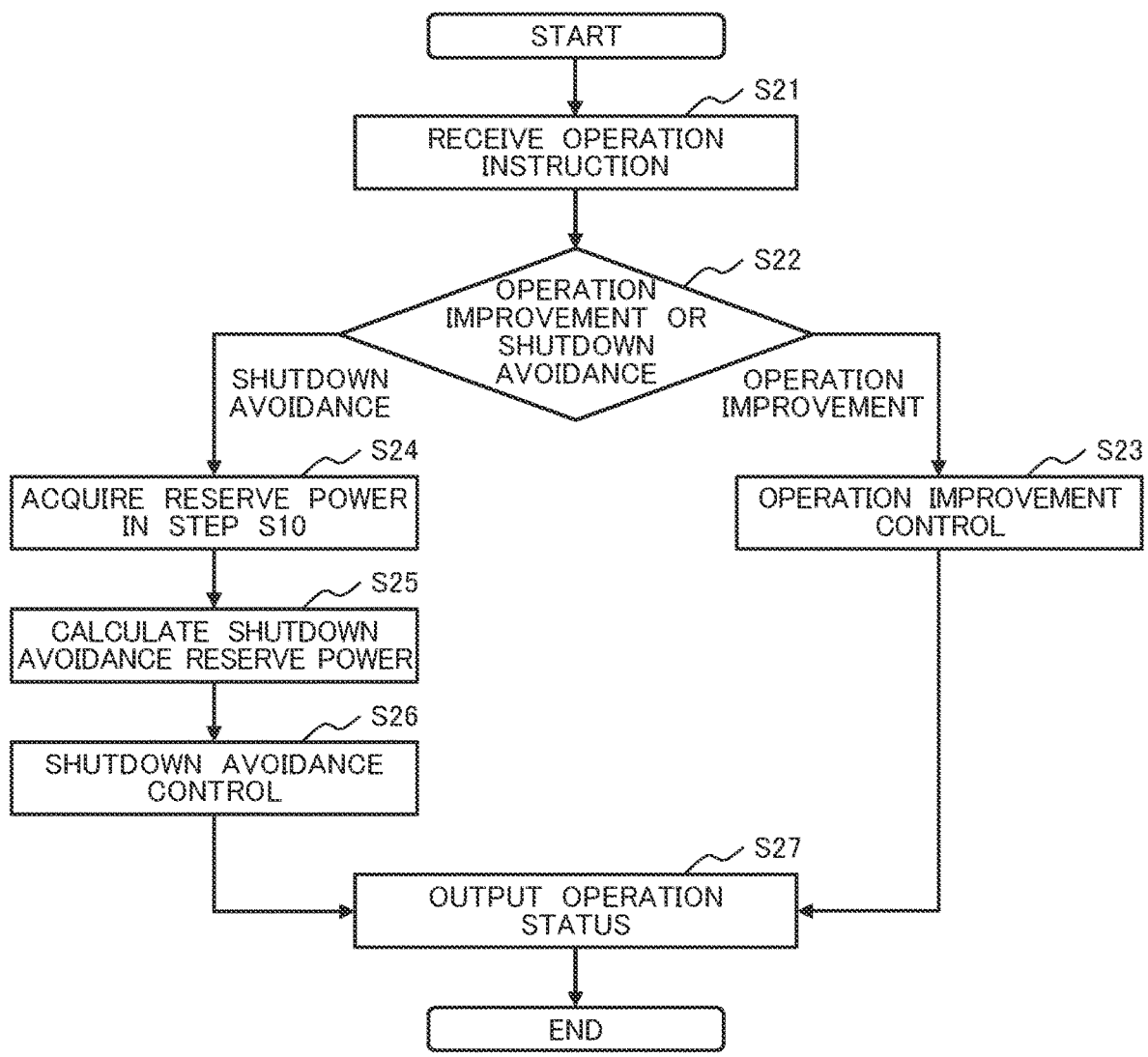
FIG. 11 is a flowchart of efficient operation performed by the plant control system according to an embodiment of the present invention.

Next, FIG. 11 shows a flowchart when the plant control system 11a performs efficient operation. First, in Step S21, the I/F unit 114 of the plant control system 11a receives a notification of efficient operation control, that is, an operation instruction.

Next, in Step S22, the processing unit 111 as a control unit determines whether the received operation instruction indicates the operation improvement or the shutout avoidance in accordance with the control program 1121. As a result, if the operation is improved, the process proceeds to Step S23, and if the shutdown is avoided, the process proceeds to Step S24.

Next, in Step S23, the processing unit 111 outputs a control signal for improving the operation, that is, the combustion efficiency, to the thermal power plant 3001 of the other company through the I/F unit 114 according to the control program 1121. As a result, the operational efficiency of the thermal power plant 3001 of the other company can be improved.

In Step S24, the processing unit 111 acquires the reserve power specified in Step S10 of FIG. 4 according to the shutdown avoidance reserve power calculation program 1122. Specifically, this reserve power is the reserve power 1131 stored in the auxiliary storage device 113, and the processing unit 111 reads out the reserve power 1131 according to the shutdown avoidance reserve power calculation program 1122.

Next, in Step S25, the processing unit 111 uses the read reserve power 1131 according to the shutdown avoidance reserve power calculation program 1122 to calculate shutdown avoidance reserve power for avoiding a power outage in the power transmission area (power transmission network A). For this purpose, for example, the processing unit 111 executes an operation to increase the reserve power 1131 by multiplying the reserve power 1131 by a predetermined coefficient so as to have remaining power according to the shutdown avoidance reserve power calculation program 1122.

Then, the processing unit 111 outputs a control signal through the I/F unit 114 to the other company's thermal power plant 3001 so as to operate to improve the output so as to satisfy the calculated shutdown avoidance reserve power according to the control program 1121. As a result, the power outage in the power transmission area can be avoided by increasing the operation of the other company's thermal power plant 3001.

Next, in Step S27, the processing unit 111 notifies the plant operation assistance system 10 of the operating status of the other company's thermal power plant 3001 according to the control program 1121. This concludes the description of the processing of the plant control system 11a regarding the efficient operation.

In the above embodiment, the amount of power that can be supplied to the power market is calculated in consideration of the operating statuses of various power generation plants. In addition, when the power sales revenue decreases due to the reduction of area power demand with respect to the target power sales revenue of the plant, the mechanism for supplementing the reduced revenue with the power sales revenue from the power market is provided. In the present embodiment, in particular, the power amount is calculated by using a function that incorporates the market rate of the power market that converts the reduced power sales revenue amount into the power amount. In addition, it is possible to ensure the accuracy after simulating the operating status of other power generation plants in the same area as to whether the amount of power is acceptable if the amount of power is supplied to the market. Therefore, it is possible to determine that the power amount can be bid on the power trading market even if the power generation plant is not in good working condition and is supplied to the power market.

Furthermore, if the operating status of one of the power generation plants is higher than expected and the power cannot be sold at such a high price even if the power is supplied to the power market, the power amount is separately multiplied by a correction coefficient and corrected down to a desired power amount so that the power can be bid.

Further, in the present embodiment, the net reserve power of the power source of the power generation plant in the area is calculated. As a method of this calculation, the following numerical value is subtracted from the Σ total power source capacity derived by integrating the amount of power generation in the relevant time zone from the past power generation pattern of all power sources in the area. This numerical value is Σ power demand obtained from the total value of the "power source capacity (reactive power) for absorption of renewable energy fluctuations based on the area's weather forecast" introduced from the renewable energy fluctuation power amount calculation algorithm based on the weather forecast, and the contracted power amount based on the contracted power determination algorithm.

If the numerical value obtained by calculating a difference between this net reserve power and the amount of power supplied to the power trading market transmitted as information from the abovementioned plant optimum operation plan assistance system is positive, it is indicated that the net reserve power has a sufficient power amount to supply the power to the power trading market. On the other hand, when the value is negative, it is indicated that the net reserve power does not have enough remaining power to supply the power to the power market.

Furthermore, if a difference between the reserve power command value or the reserve unsecured command value and the real reserve power calculated from the real-time plant output obtained from the thermal power control system is less than the reserve power, the correction of the reserve power command can be omitted. On the other hand, when the reserve power command value exceeds the real-time reserve power, the output of the power generation plant is improved to secure the reserve power in the control algorithm of each power generation equipment piece in the plant control system. Moreover, the reserve power for the shortage in the current power generation plant will be secured.

In addition, bid on the power trading market can be performed based on the reserve power information and the net reserve power, and the contracted power sales revenue is transmitted as information to the plant operation assistance system 10 and the power sales balance of the relevant power company or the power generation plant can be calculated by an economic calculation algorithm.

It should be noted that, due to the liberalization of power, the power generation companies need to earn margins on power transactions through the power trading market, and the frequency of such transactions is expected to increase in the future. Moreover, the power generation companies continue the business activities to maximize profits by putting the appropriate time and amount into the power market.

In the present embodiment, when the power sales revenue, which is a basic revenue, is reduced from the drop in area demand from the viewpoint of the economic balance of the power generation plant, the operating status of other power generation plants in the area where the power generation plant is located is simulated. Then, an appropriate amount of power that can be sold when bidding the power on the power trading market can be secured. Therefore, it is possible to secure net reserve power in cooperation with each control algorithm of the power generation equipment in the thermal power plant on the site side, and then supply the net reserve power to the power trading market to match the economic balance of the power generation plant with the target power sales revenue.

In addition, as the organizational structure is reviewed due to the separation of power generation and power transmission, it can be easily assumed that the momentum for not implementing timely and reliable technical transfer will increase. Therefore, in the present embodiment, the above-mentioned processing contents and the same simulation can be used as an educational subject for the staff of the power company. According to the present embodiment, it is possible to digitize the knowledge of equipment operation and maintenance of skilled workers regardless of time and place. Then, the digitized information can be converted into educational materials, and finally, at the training center (for example, an educational room in a virtual space), an educational course can be held not only for general power companies but also for new power companies. Therefore, according to the present embodiment, technical transfer can be realized. For example, even after a skilled worker retires, the technique is handed down, leading to long-term preventive maintenance activities. That is, it is also possible to construct an education business model utilizing the present embodiment.

REFERENCE SIGNS LIST

10 . . . plant operation assistance system, 11a, 11b . . . plant control system, 12 . . . central power supply command system, 13 to 17 . . . terminal device, 20 . . . power exchange system, 30 . . . another company's plant control system, 31 . . . terminal device, 40 . . . Internet, 50 . . . intranet, 71 . . . general household, 72 . . . building, 73 . . . factory, 1101 . . . thermal power plant, 1102 . . . pumped storage power plant, 3001 . . . another company's thermal power plant

The invention claimed is:

1. A power generation plant control system, comprising:
a power plant including a plant controller coupled to a network,
a boiler, a turbine and a generator coupled to the plant controller;
a power plant operation assistance computer coupled to the network;
a central power supply command computer coupled to the network; and
the power plant operation assistance system computer is configured to:
receive an area demand amount in a power transmission area to which the power plant supplies the power;
determine that a power selling revenue at the power plant decreases by more than a predetermined standard based on the area demand amount,
create bid data including a power generation amount of the power plant according to a decrease in the power selling revenue;
determine reserve power of the power plant based on the area demand amount and the power generation amount;
generate a reserve power command to secure the reserve power in the power transmission area of the power plant wherein, the reserve power is determined based on a use of the reserve power in the power transmission area;
send the reserve power command to the central power supply command computer via the network;
wherein the central power supply command computer is configured to:
activate a switch to activate either a plant shutdown avoidance application or a fuel efficiency improvement application; and
output an operation control command to the plant controller via the network; and
wherein the plant controller is configured to:
control the power plant by controlling each of the boiler, the turbine, and the generator in accordance with the operation control command.

2. The power plant control system according to claim 1, wherein the plant shutdown avoidance application generates a control signal for avoiding a power outage in the power transmission area.

3. The power plant control system according to claim 2, wherein the central power supply command computer is further configured to calculate shutdown avoidance reserve power for avoiding the power outage.

4. The power plant control system according to claim 1, wherein the central power supply command computer is further configured to:
generate a control signal for improving combustion in the power plant as compared with normal operation.

5. The power plant control system according to claim 1, wherein the area demand amount is predicted for each zone within the power transmission area.

6. The power plant control system according to claim 1, wherein the central power supply command computer is further configured to:
calculate a reactive power including a fluctuation of the power plant due to a renewable energy of the power plant, and
calculate the reserve power based on the reactive power.

* * * * *